United States Patent [19]

Yoshikawa et al.

[11] Patent Number: 5,098,627
[45] Date of Patent: Mar. 24, 1992

[54] METHOD FOR PRODUCING A PAPER-RELEASING GUIDE-CLAW OF COPYING MACHINE

[75] Inventors: Masao Yoshikawa, Mie; Taizo Nagahiro, Tokyo, both of Japan

[73] Assignees: NTN-Rulon Industries Company Ltd.; Mitsui Toatsu Chemicals, Inc., both of Tokyo, Japan

[21] Appl. No.: 576,146

[22] Filed: Aug. 30, 1990

Related U.S. Application Data

[63] Continuation of Ser. No. 284,679, Dec. 15, 1988, abandoned.

[30] Foreign Application Priority Data

Dec. 15, 1987 [JP] Japan .................. 62-316859

[51] Int. Cl.$^5$ .................. B29C 71/02; C08G 73/10; G03G 21/00
[52] U.S. Cl. .................. 264/235; 264/300; 264/328.18; 264/331.12; 264/331.19; 271/308; 271/311; 271/900; 355/315; 524/406; 524/419; 524/420; 524/600; 524/606; 525/199; 525/282; 528/125; 528/128; 528/184; 528/185; 528/188
[58] Field of Search .......... 264/234, 235, 300, 331.12, 264/331.19, 331.21, 345, 346, 328.18; 271/306, 307, 308, 311, 900; 355/308, 315; 524/406, 419, 420, 600, 606; 525/199, 282; 528/125, 128, 184, 185, 188

[56] References Cited

U.S. PATENT DOCUMENTS

| | | | |
|---|---|---|---|
| 4,806,985 | 2/1989 | Foley et al. | 355/315 |
| 4,847,349 | 7/1989 | Ohta et al. | 528/125 |

FOREIGN PATENT DOCUMENTS

| | | | |
|---|---|---|---|
| 56-51766 | 5/1981 | Japan . | |
| 61-23554 | 6/1986 | Japan . | |
| 62-132960 | 6/1987 | Japan | 264/331.19 |
| 63-60737 | 3/1988 | Japan . | |

OTHER PUBLICATIONS

Recchia, F. P. et al., "Thermoplastic Polyimide".IN: *Modern Plastics Encyclopedia* 1982-1983 (New York, McGraw-Hill, 1982), pp. 82-84.
English-Language Translation of Japanese Reference (Kokai) 56-51,766 (Published 5/81).

*Primary Examiner*—Leo B. Tentoni
*Attorney, Agent, or Firm*—Burns, Doane, Swecker & Mathis

[57] ABSTRACT

The present invention relates to a paper releasing guide-claw for a copying machine and a method for producing the same including molding a material containing from about 50-90% by weight of a polyimide consisting essentially of recurring units of the formula:

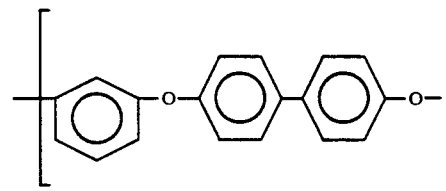

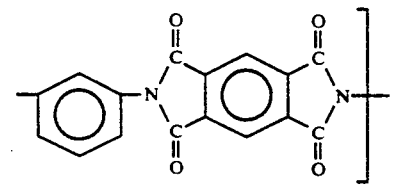

from about 5 to about 40% by weight of a fibrous reinforcing material, and from about 5 to about 30% by weight of a solid lubricant, wherein the sum of the content of the fibrous reinforcing material and the solid lubricant is from about 10 to about 50% by weight, heat treating the molded guide-claw at a temperature of from about 250° C. to about 340° C. for a time sufficient to increase the density of the polyimide component by 1.5%.

2 Claims, 1 Drawing Sheet

METHOD FOR PRODUCING A PAPER-RELEASING GUIDE-CLAW OF COPYING MACHINE

This application is a continuation of application Ser. No. 284,679, filed Dec. 15, 1988, now abandoned.

BACKGROUND OF THE INVENTION

1. Field of the Invention

The present invention relates to a paper-releasing guide-claw for a copying machine and a method for producing the same. More specifically, the invention relates to a method for producing a paper-releasing guide-claw for a copying machine having excellent dimensional stability and heat distortion resistance at high temperatures.

2. Description of the Prior Art

Dry process copying machines usually form electrostatic latent images corresponding to characters and graphics on a surface of a photosensitive drum. The latent images are converted to toner images and transferred onto a surface of paper supplied from a paper feeding cassette. Thereafter the transferred toner images are fixed on the surface of paper. A mechanism is integrated into the copying machines so that the paper surface is hot pressed with a heated fixing roller whereby the molten toner images are adhered to the fiber of the paper. Such heat fixing prevents removal of the toner from the surface of the paper. After passing through the fixing roller, the copying paper must be ejected without being wound around the roller. A guide-claw is employed to scoop up the edge of the copying paper. The head of the guide-claw contacts the peripheral surface of the fixing roller.

It is necessary that a paper-releasing guide-claw have the following properties:

(a) low frictional resistance to the peripheral surface of the roller to insure that the roller surface is not damaged;

(b) good mechanical strength and high temperature stiffness;

(c) the toner must not adhere to the guide-claw.

Recently developed copying machines are capable of producing copies at a higher speed than prior art machines. The heating temperature of the fixing roller is often set at higher levels for faster copying machines. Thus the paper-releasing guide-claw must have a heat resistance of at least 250° C., in some cases at least 300° C.

Various methods have been proposed to date for improving non-tackiness of the paper-releasing guide-claw toward printing toners. It has been proposed to add improvers such as a fluoro resin to materials from which paper-releasing guide-claws are made or to form a film from a fluoro resin or low molecular weight polymer of a specific fluoro resin, to the surface of the guide-claw.

Japanese Patent Publication No. 23554/1986 discloses a method for preparing a paper-releasing guide-claw of a copying machine. The method comprises molding a polyamide-imide into a prescribed shape, subjecting the molded paper-releasing guide-claw to heat treatment, followed by coating the surface of the molded product with a fluorine containing resin, and then baking the coated product. It is reported in the above publication that the paper-releasing guide-claw thus obtained has improved heat resistance over conventional paper-releasing guide-claws and can resist temperatures above 200° C.

Japanese Patent Laid-Open No. 60737/1988 discloses a method for preparing a paper-releasing guide-claw which comprises molding a polyamide-imide resin into a prescribed shape, coating the surface of the molded product with a fluorine containing resin, and then heat treating the coated resin. This method decreases the number of steps of the method described in Japanese Patent Publication No. 23554/1986 and provides a paper-releasing guide-claw resistant to temperatures up to 250° C.

The above two methods employ polyamide-imide. Polyamide-imide contains polyamic acid linkages prior to molding and thus has residual thermoplasticity. Imidization by dehydration and heat curing are carried out which enhance heat resistance.

However, improvement of heat distortion resistance essentially depends upon the type of heat resistant resin used a the material for the paper-releasing guide-claw. Representative exemplary materials used for producing the guide-claw include polyamide-imide, polyphenylene sulfide, polyether ether ketone, polyether ketone, polyether sulfone, polyetherimide, polysulfone and aromatic polyester.

Amorphous resins such as polyether sulfone, polyetherimide and polysulfone have glass transition temperatures lower than 250° C. Softening of resins commences at such glass transition temperatures and thus the heat resistance of these resins is low.

On the other hand, polyphenylene sulfide, polyether ether ketone and polyether ketone are crystalline resins. The heat resistance of these resins can be improved to some extent by compounding high-temperature resistant fibers such as glass fibers and carbon fibers into these resins or by adding inorganic powdery fillers such as mica and talc to these resins. However, when heated above 300° C. by the fixing roller, the head of the paper-releasing guide-claw contacting the roller is gradually deformed which causes a problem of severe reduction in the releasing function. Japanese Patent Publication Nos. 23554/1986 and Laid-Open No. 60737/1988 disclose that polyamideimide has a heat resistance of about 250° C. when used as a paper-releasing guide-claw, however, the head of the guide-claw gradually deforms at a temperature of about 300° C. and lowers its releasing function.

Polyimide resins are noteworthy only with respect to their heat resistance. Many polyimide resins that exhibit excellent properties have been developed to date. These resins, however, are generally brittle, insufficient in high temperature impact strength, and hard to mold because they are insoluble in solvents and have high softening temperatures. For example, polyimide resins consisting of a primary chain of the formula (I):

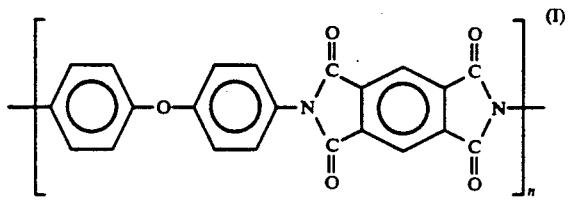

(Trademark; KAPTON and VESPEL, Products of E. I. Du Pont de Nemours & Co.) have no distinct glass transition temperature and are excellent in high-temperature resistance. When such resins are used for molding materials, the hot molding process is difficult and thus is unsuitable for use in practical applications.

SUMMARY OF THE INVENTION

The present invention overcomes the problems and disadvantages of the prior art by providing a paper-releasing guide-claw for a copying machine having excellent dimensional stability and heat distortion resistance even at temperatures as high as 300° C. and which is capable of being molded in a molten state.

It is an object of the invention to provide a paper-releasing guide-claw for a copying machine having excellent heat resistance.

It is a further object of the invention to provide a paper-releasing guide-claw for a copying machine which is very accurate.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the present invention relates to a method for making a paper-releasing guide-claw for a copying machine which has remarkably enhanced heat distortion resistance. The invention comprises:

(1) molding a material comprising
(a) from about 50% to about 90% by weight of a polyimide compound having recurring units of the formula (II):

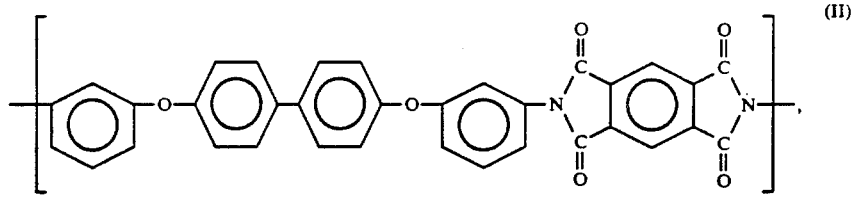

(b) from about 5% to about 40% by weight of a fibrous reinforcing material, and
(c) from about 5% to about 30% by weight of a solid lubricant,
wherein the sum of the fibrous reinforcing material and the solid lubricant is from about 10% to about 50% by weight,
(2) heat treating the molded product at a temperature of from about 250° C. to about 340° C. for a time sufficient to cause at least about a 1.5% increase in the density of the polyimide compound in the molded product.

The paper-releasing guide-claw of this invention has remarkable heat resistance caused by the heat treatment and has a very accurate edge. Because of these features, the guide-claw is particularly useful at high temperatures.

The accompanying drawings, which are incorporated in and constitute a part of this specification, illustrate several exemplary embodiments of the invention and together with the description, serve to explain the principles of the invention.

DESCRIPTION OF THE PREFERRED EMBODIMENTS

Figure 1:
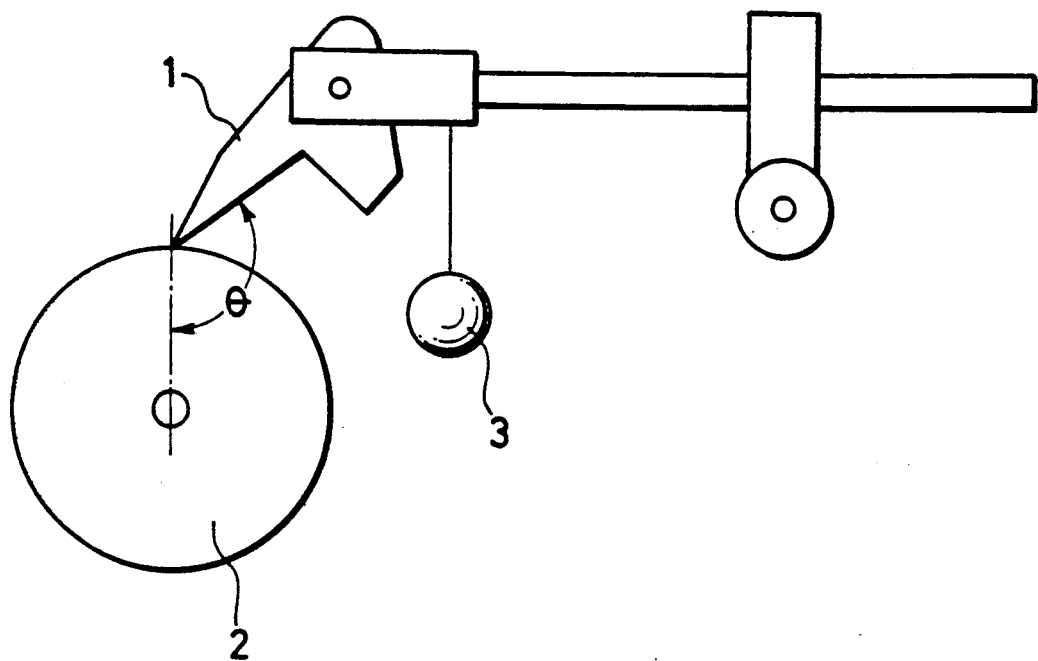
FIG. 1 is a schematic illustration of an apparatus for testing heat distortion at the head of the guide-claw.

Reference will now be made in detail to the preferred embodiments of the invention.

The polyimide compound of the formula (II) is prepared by reacting 4,4'-bis(3-aminophenoxy)biphenyl with pyromellitic dianhydride in an organic solvent at a temperature of about 60° C. or less, preferably 50° C. or less to obtain a polyamic acid having recurring units of the formula (III):

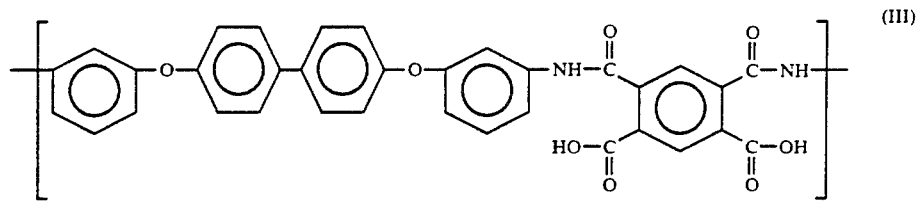

Suitable organic solvents for use in the reaction include N,N-dimethyl formamide, N-methyl-2-pyrrolidone and 1,2-dimethoxyethane. The resultant polyamic acid intermediate is then dehydrated by heating at a temperature of from about 100° C. to about 400° C. or by chemically imidizing the intermediate by using an ordinary imidizing agent to obtain a polyimide of the formula (II). The polyimide is thermoplastic.

The polyimide used in this invention is also described in detail in the specification of U.S. Pat. No. 4,847,349, which is incorporated herein by reference.

The molding material used in this invention can be prepared by blending a polyimide of the formula (II) with prescribed amounts of fibrous reinforcing material and solid lubricant and then uniformly kneading and pelletizing with a melt kneading method, for example, a heated extruder. The molding material thus obtained is plasticized by heat at a temperature of from about 390° C. to about 450° C. and then placed into a metal mold. The desired guide-claw can be obtained by solidifying and releasing the product from the mold. A guide-claw having excellent heat distortion resistance and dimensional stability is thereby produced.

The heat treatment is preferably carried out at a temperature of from about 250° C. to about 340° C., more preferably from about 270° C. to about 330° C. A temperature exceeding 340° C. is unfavorable because severe heat distortion is generated on the guide-claw. On the other hand, enhancement of heat distortion resistance cannot be achieved at temperatures lower than 250° C. The heat treatment time varies widely depending upon the temperature, however, at least two minutes of heat treatment is necessary. In some cases, heating must be carried out for several weeks.

In the present invention, heat treatment may be conducted for a time sufficient to cause at least about a 1.5% increase in the density of the polyimide component of the formula II). The increase in density of the polyimide component can be determined by measuring the density of the guide-claw before and after heat treatment in accordance with ASTM-D792 and calculating the blending ratio of each component in the molding material. The required time for heat treatment is from several days to several weeks by heating at 260° C., 12 hours or more at 270° C., 1 hour or more at 280° C., at least 10 minutes at 300° C., two minutes and more at 330° C. and at least 10 minutes at 340° C. The required time is minimal at 330° C.

Heat treatment of the paper-releasing guide-claw is carried out by placing the guide-claw in a heating oven such as an electric oven, a hot air circulating oven, or a hot air ventilating oven.

Suitable components for use in the molding material of the invention include fibrous reinforcing materials such as potassium titanate fiber, asbestos fiber, aromatic polyimide fiber, carbon fiber, boron fiber and glass fiber; and solid lubricants such as graphite, tetrafluoroethylene resin (hereinafter abbreviated as PTFE), molybdenum disulfide, fluorinated graphite and lead monoxide. Among the fibrous reinforcing materials, potassium titanate fiber particularly provides a marked effect on the enhancement of heat distortion resistance. Preferably, the potassium titanate fiber employed has a diameter of from about 0.5 to about 20 μm and a length of from about 0.005 to about 0.05 mm. In order to provide affinity with the polyimide, surface treating agents such as silane coupling agents and titanate coupling agents may also be applied to achieve desired properties.

Among the solid lubricants, graphite and PTFE particularly lead to a remarkable reduction in frictional resistance between the head of the guide-claw and the peripheral surface of the roller. Further, such lubricants prevent scratching of the roller surface.

When the sum of the fibrous reinforcing material and the solid lubricant exceeds 50% by weight of the total resin composition, and the amount of the polyimide decreases to less than 50% by weight, a uniform resin composition cannot be achieved due to insufficient mixing. Further, molding becomes difficult due to poor flowability of the molten resin composition.

When the sum of the fibrous reinforcing material and the solid lubricant is less than 10% by weight, the reinforcing effect is insufficient. Even if the sum of the fibrous reinforcing material and the solid lubricant is from about 10-50% by weight, the reinforcing effect on heat distortion resistance is insufficient when the amount of the fibrous reinforcing material is less than 5% by weight.

To the contrary, when the amount of the solid lubricant is less than 5% by weight, the lubricating effect is not sufficient to prevent scratching of the peripheral roller surface. When the amount of the fibrous reinforcing material exceeds 40% by weight, mixing becomes insufficient due to the difference of bulk density between the polyimide of the formula (II) and the fibrous reinforcing material. Under such conditions, compounding becomes difficult and a uniform composition cannot be produced. An amount of solid lubricant exceeding 30% by weight is unfavorable because flowability of the molten resin composition markedly decreases and heat distortion resistance of the molded product also significantly decreases.

The fibrous reinforcing material and solid lubricant may be separately fed into a fusion mixer. The components may also be dry blended in advance with a common mixer such as a Henschel mixer, a tumbler mixer or a ribbon blender, and then fed into the fusion mixer. Any practical procedures for mixing these components may be employed.

Suitable amounts of antioxidants, heat stabilizers, ultraviolet absorbers, coloring agents, flame retardants, antistatic agents and crystallization accelerators may be added providing that the additives do not adversely affect the objects of the invention.

By preparing the paper-releasing guide-claw by fusion molding a material containing a polyimide of the formula (II), followed by heat treatment, the density of the claw increases, which enhances the heat distortion resistance and dimensional stability of the claw.

The invention will be further clarified by the following examples, which are intended to be purely exemplary of the invention.

EXAMPLE

The raw materials used in the Examples and Comparative Examples are summarized below. The unit of proportion of these raw materials is % by weight.

(1) Polyimide of the formula (II) (Trademark: NEW TPI, Product of Mitsui Toatsu Chemicals, Inc.)
(2) Potassium titanate fiber (Trademark: TISMO D-102, Product of Ohtsuka Chemicals Co.)
(3) Graphite (Trademark: ACP, Product of Nihon Graphite Co.)
(4) PTFE (Trademark; KTL600, Product of Kitamura Co.)

EXAMPLES 1-6

Polyimide and other various raw materials were dry blended in the proportions set forth in Table 1 and pelletized after extruding at 390–400° C. with a twin screw extruder. The pellets where charged into an injection molding machine having a cylinder temperature of from about 390° C. to about 400° C., an injection pressure of about 1000 kg/cm² and a mold temperature of from about 150° C. to about 200° C. to form molded paper-releasing guide-claws. The shape of these guide-claws were the same as those used in the dry process copying machine, Model FX-2700, Product of Fuji Xerox Co. Heat treatment was carried out at 280° C. for 5 hours in Examples 1-5 and at 300° C. for 1 hour in Example 6.

TABLE 1

| Raw material | Example | | | | | |
|---|---|---|---|---|---|---|
| | 1 | 2 | 3 | 4 | 5 | 6 |
| Polyimide of the formula (II) | 58 | 65 | 70 | 74 | 84 | 74 |
| Potassium titanate fiber | 30 | 15 | 20 | 20.3 | 10 | 20.3 |
| Graphite | 12 | 20 | | 5.7 | 6 | 5.7 |

TABLE 1-continued

| Raw material | Example | | | | | |
|---|---|---|---|---|---|---|
| | 1 | 2 | 3 | 4 | 5 | 6 |
| PTFE | | | | | 10 | |

Heat resistance (amount of deformation) of the claw-head, shape of the claw-head, prevention of scratch on the roller surface, and ratio of density increase in the polyimide component were evaluated on the molded specimens of the guide-claw. The results are summarized in Table 2. The evaluations were conducted by the following methods.

(a) Heat Resistance

Figure 2:
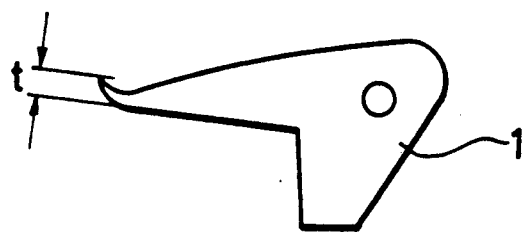
FIG. 2 is a diagram illustrating the amount of distortion at the head of the guide-claw.

A guide-claw specimen (1) was set on a heat distortion tester schematically illustrated in FIG. 1. A hot roller (2) was heated to 300° C. A load (3) having a weight of 20 g was mounted to the tester. The hot roller was rotated under a contact angle $\theta$ of 100° and a contact time of 20 seconds. The resulting deformation (t) was measured as illustrated in FIG. 2. The measurement was carried out on 50 specimens of the guide-claw. The average and dispersion were determined. Dispersion is illustrated by minimum and maximum values.

(b) Head Shape of Guide-Claw

The radius of curvature at the head of the guide-claw was measured on 50 pieces of molded guide-claw specimens by using a projector with a magnification of 20 times with the radius of curvature rule. The results are illustrated by the range of dispersion from minimum to maximum.

$\Delta$ . . . Relatively small quantity of scratches were found.

X . . . Relatively large quantity of scratches were found.

(d) Density Increase Ratio of Polyimide Component

In accordance with ASTM-D792, densities before and after heat treatment were measured. The density increase ratio of the polyimide component in the base material was calculated from the equation described below.

$p_A$: Density of molded guide-claw specimen before heat treatment (measured value).

$p_C$: Density of molded guide-claw specimen after heat treatment (measured value).

$p_H$: Density of filler (measured value of true density).

$a$: % by weight of polyimide component.

$(100-a)$: % by weight of fillers.

$$\text{Density increase ratio} = \frac{100 \, p_H(p_C - p_A)}{p_A[100 \, p_H - p_C(100 - a)]} \times 100[\%]$$

COMPARATIVE EXAMPLES 1-9

Extrusion, pelletizing and molding of test specimens were carried out by the same procedures as described in Example 1 except that the compounding proportions were varied as set forth in Table 3. The properties of the specimens obtained were evaluated. The results are set forth in Table 4. As set forth in Tables 1 and 3, the compounding proportions of Comparative Examples 1, 2 and 3 were the same as those of Examples 1, 3 and 5 respectively. The compounding proportion of Compar-

TABLE 2

| | | | Example | | | | | |
|---|---|---|---|---|---|---|---|---|
| | | | 1 | 2 | 3 | 4 | 5 | 6 |
| Heat treatment condition | Temperature (°C.) | | 280 | 280 | 280 | 280 | 280 | 300 |
| | Time (hour) | | 5 | 5 | 5 | 5 | 5 | 1 |
| Heat distortion at the head (μm) | Before heat treatment | Average | 130 | 182 | 221 | 210 | 230 | 216 |
| | | Dispersion | 121-136 | 169-193 | 215-224 | 190-225 | 224-237 | 192-223 |
| | After heat treatment | Average | 0 | 0 | 10 | 0 | 3 | 1 |
| | | Dispersion | 0 | 0 | 8-13 | 0 | 0-5 | 0-1 |
| Dispersion of radius of curvature at the head (μm) | Before heat treatment | | 5-35 | 5-35 | 5-25 | 5-30 | 5-30 | 5-30 |
| | After heat treatment | | 5-35 | 10-35 | 10-35 | 10-35 | 10-35 | 10-35 |
| Non-scratching property to fixing roller | | | ○ | ○ | ○ | ○ | ○ | Δ |
| Density increase ratio of polyimide component by heat treatment (%) | | | +1.79 | +1.83 | +1.75 | +1.85 | +1.78 | +1.82 |

(c) Non-Scratching Property

The test was carried out by using a dry process copying machine Model FX-2700 TM; Product of Fuji Xerox Co.

The test specimens having the same shape as the guide-claw of the copying machine were installed on the normal position. A set of papers consisting of 99 separate sheets of B-5 size were continuously passed through the copying machine. The procedure was repeated until a total of 50,000 sheets were passed through the machine. The level of scratches generated on the surface of fixing roller were evaluated by visual observation. The level of scratches were divided into the following three classes.

○ . . . No scratches were found.

ative Example 7 was the same as the proportions of Examples 4 and 5. However, heat treatment conditions such as temperature and time were different in the Examples and Comparative Examples as set forth in Tables 2 and 4.

TABLE 3

| | Comparative Example | | | | | | | | |
|---|---|---|---|---|---|---|---|---|---|
| Raw material | 1 | 2 | 3 | 4 | 5 | 6 | 7 | 8 | 9 |
| Polyimide of the formula (II) | 58 | 70 | 84 | 70 | 70 | 45 | 74 | | 100 |
| Potassium titanate fiber | 30 | 20 | 10 | 30 | | 50 | 20.3 | 30 | |
| Graphite | 12 | | 6 | | 30 | 5 | 5.7 | | |
| PTFE | | 10 | | | | | | | |
| Polyamide-imide | | | | | | | | 70 | |

TABLE 4

| | | | Comparative Example | | | | | | | | |
|---|---|---|---|---|---|---|---|---|---|---|---|
| | | | 1 | 2 | 3 | 4 | 5 | 6 | 7 | 8 | 9 |
| Heat treatment condition | Temperature (°C.) | | 240 | 240 | 240 | 280 | 280 | 280 | 350 | 250 | 280 |
| | Time (hour) | | 5 | 5 | 5 | 5 | 5 | 5 | 5 | 24 | 5 |
| Heat distortion at the head (μm) | Before the treatment | Average | 130 | 252 | 238 | 191 | 290 | 53 | 210 | 262 | 238 |
| | | Dispersion | 105–151 | 235–276 | 217–252 | 173–220 | 277–305 | 41–60 | 190–225 | 248–280 | 227–245 |
| | After heat treatment | Average | 108 | 248 | 232 | 0 | 212 | 0 | Note 1 | 203 | 128 |
| | | Dispersion | 78–136 | 233–261 | 215–251 | 0 | 201–220 | 0 | 5–30 | 189–213 | 83–151 |
| Dispersion of radius of curvature at the head (μm) | Before heat treatment | | 10–35 | 5–25 | 10–35 | 5–25 | 5–25 | 25–50 | Note 1 | 10–35 | 10–35 |
| | After heat treatment | | 10–35 | 5–25 | 10–35 | 5–25 | 5–25 | 25–50 | Note 1 | 10–35 | 10–35 |
| Non-scratching property to fixing roller | | | ○ | ○ | ○ | X | ○ | X | Note 1 | ○ | Δ |
| Density increase ratio of polyimide component by heat treatment (%) | | | 0 | 0 | 0 | +1.76 | +1.83 | +1.79 | Note 2 | +1.20 Note 3 | +1.90 |

Note 1: Specimens were deformed in the heat treatment. Measurement was impossible.
Note 2: Bubbles were generated in the specimens. Measurement was impossible.
Note 3: Density increase ratio of polyamide-imide component.

As understood by comparison of Table 2 and Table 4, the guide-claws of Examples 1–6 caused no scratching to the fixing roller. Even though the surface of the contacted roller had a temperature of 300° C., no substantial deformation at the head of the guide-claw was observed. Therefore, the guide-claw specimens of these Examples have excellent heat resistance at high temperatures.

On the other hand, Comparative Examples 1–3 were carried out at heat treatment temperatures of 240° C., which is lower than the heat treatment temperature of the invention.

In Comparative Example 5, a solid lubricant was employed as a filler. In Comparative Example 8, a polyamideimide resin to which filler had been added was used. In Comparative Example 9, no filler was used. The specimens of these Comparative Examples had good non-scratching property, but lead to large deformations of the head of the guide-claw at 300° C. In Comparative Example 4, a fibrous reinforcing material alone was used as a filler, and in Comparative Example 6, a fibrous reinforcing material was used in an amount exceeding the specified limit of the present invention. Specimens of these Comparative Examples did not cause deformation at 300° C. at the head of the guide-claw. These specimens, however, injured the fixing roller and caused a large dispersion in the radius of curvature at the head of the guide-claw. Thus, these specimens are poor in dimensional stability. In Comparative Example 7, heat treatment was carried out at a temperature of 350° C., which is higher than that of the invention. Under such conditions, specimens were deformed at the head of the guide-claw and measurement was impossible.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for producing a paper-releasing guide-claw for copying machine comprising (1) molding a paper-releasing guide-claw by injection molding a material comprising (a) from about 50% by weight to about 90% by weight of a polyimide compound containing recurring units of the formula

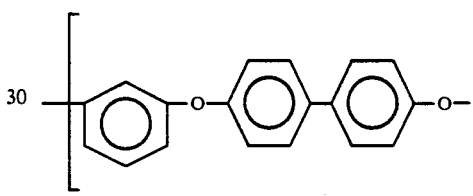

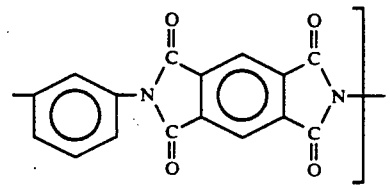

(b) from about 5% by weight to about 40% by weight of a fibrous reinforcing material selected from the group consisting of potassium titanate fiber having a diameter of from about 0.5 μm to about 20 μm and a length of from about 0.005 mm to about 0.05 mm, asbestos fiber, aromatic polyimide fiber, carbon fiber, boron fiber and glass fiber; and (c) from about 5% by weight to about 30% by weight of a solid lubricant selected from the group consisting of graphite, tetrafluoroethylene resin, molybdenum disulfide, fluorinated graphite and lead monoxide wherein the sum of the fibrous reinforcing material and the solid lubricant is from about 10% by weight to about 50% by weight; and (2) heat treating the molded paper-releasing guide-claw at a temperature of from about 250° C. to about 340° C. for a time sufficient to increase the density of the polyimide compound by at least 1.5%.

2. A paper releasing guide-claw for a copying machine prepared by the method of claim 1.

* * * * *